(12) United States Patent
Wang et al.

(10) Patent No.: US 11,465,528 B2
(45) Date of Patent: Oct. 11, 2022

(54) CHARGING DEVICES AND MANAGEMENT METHODS FOR STATUS DISPLAYING

(71) Applicant: Noodoe Corporation, Taipei (TW)

(72) Inventors: John C. Wang, Taipei (TW);
Jen-Chieh Hsu, Taipei (TW);
Ying-Chieh Hu, Taipei (TW);
Chien-Chih Yu, Taipei (TW); Pu-Ying Lin, Taipei (TW)

(73) Assignee: NOODOE CORPORATION, Taipei (TW)

( * ) Notice: Subject to any disclaimer, the term of this patent is extended or adjusted under 35 U.S.C. 154(b) by 278 days.

(21) Appl. No.: 17/026,455

(22) Filed: Sep. 21, 2020

(65) Prior Publication Data
US 2021/0086650 A1 Mar. 25, 2021

(51) Int. Cl.
| | |
|---|---|
| *B60L 53/66* | (2019.01) |
| *H02J 7/00* | (2006.01) |
| *H05B 45/10* | (2020.01) |
| *H05B 45/20* | (2020.01) |
| *B60K 35/00* | (2006.01) |

(52) U.S. Cl.
CPC .............. *B60L 53/66* (2019.02); *B60K 35/00* (2013.01); *H02J 7/0047* (2013.01); *H05B 45/10* (2020.01); *H05B 45/20* (2020.01); *B60K 2370/332* (2019.05); *B60K 2370/336* (2019.05); *B60K 2370/343* (2019.05); *B60L 2250/16* (2013.01)

(58) Field of Classification Search
CPC ...... B60L 53/66; B60L 2250/16; B60L 53/60; B60L 53/62; B60L 53/00; H05B 45/20; H05B 45/10; B60K 35/00; B60K 2370/343; B60K 2370/336; B60K 2370/332; H02J 7/0047; F21V 5/00; F21V 23/00; F21V 2200/00; F21V 2200/20; F21Y 2115/10; G02F 1/133602; G02F 1/133603
See application file for complete search history.

(56) References Cited

U.S. PATENT DOCUMENTS

| | | | |
|---|---|---|---|
| 9,180,783 B1 * | 11/2015 | Penilla | B60L 53/126 |
| 2011/0032110 A1 * | 2/2011 | Taguchi | G01C 21/3697 |
| | | | 340/636.1 |

(Continued)

*Primary Examiner* — Bao Q Truong
(74) *Attorney, Agent, or Firm* — McClure, Qualey & Rodack, LLP

(57) ABSTRACT

A charging device for an electric vehicle includes a network connection unit, a display light-panel, and a processor. The network connection unit is coupled to a server through a network and receives an indication of an operation of a charging procedure performed by a user device corresponding to the electric vehicle via the network. The display light-panel has an optical light-guiding component and a backlight module, wherein the optical light-guiding component has a fixed pattern printed thereon and the backlight module includes light sources, and the optical light-guiding component and the light sources are respectively disposed to operate the display light-panel in at least one illumination mode. The processor respectively changes the illumination mode of the display light-panel in response to the received indication, such that the display light-panel changes the light sources to generate an interaction display effect corresponding to the operation of the charging procedure.

19 Claims, 7 Drawing Sheets

(56) References Cited

U.S. PATENT DOCUMENTS

2013/0026985 A1\* 1/2013 McMullin ............. B60L 15/007
　　　　　　　　　　　　　　　　　　　　　　　320/109
2014/0089016 A1\* 3/2014 Smullin ................ G06Q 10/02
　　　　　　　　　　　　　　　　　　　　　　　705/5

\* cited by examiner

CHARGING DEVICES AND MANAGEMENT METHODS FOR STATUS DISPLAYING

BACKGROUND OF THE INVENTION

Field of the Invention

The disclosure relates generally to charging devices and management methods thereof, and, more particularly to charging devices and management methods thereof that can perform related status displaying managements for charging devices of electric vehicles.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

Generally, the charging device in the charging station has a display unit to provide the user with an indication of the charging state. Some charging devices use expensive displays, such as liquid crystal displays, as display units. Although they can provide clear instructions, the cost is also increased. Due to cost considerations, some charging devices only provide a few light-emitting diodes (LEDs) as indicator lights, which can provide users with information about the charging state by turning on and off the LEDs. Although the use of charging device with the LEDs can reduce the cost, the charging state indication provided by such charging devices are relatively monotonous and unclear, which may cause inconvenience to users and reduce their willingness to use.

BRIEF SUMMARY OF THE INVENTION

Charging devices and management methods for status displaying thereof are provided, which can reduce the manufacturing cost by providing the charging device with a display light-panel composed of low-cost light-emitting elements, and can vary illumination modes of light sources within the display light-panel of the charging device to interact with an user according to the operation state of a charging procedure when the user is performing a charging service, not only making it easier for users to handle the operation state of the charging procedure, but also bring users a better user experience.

An embodiment of a charging device for outputting power to charge an electric vehicle comprises a network connection unit, a display light-panel and a processor. The network connection unit is coupled to a server through a network and receives an indication of an operation of a charging procedure performed by a user device corresponding to the electric vehicle via the network. The display light-panel has an optical light-guiding component and a backlight module, wherein the optical light-guiding component has a fixed pattern printed thereon and the backlight module includes light sources, and the optical light-guiding component and the light sources are respectively disposed to operate the display light-panel in at least one illumination mode. The processor is coupled to the network connection unit and the display light-panel and is configured to respectively change the at least one illumination mode of the display light-panel in response to the received indication, such that the display light-panel changes the light sources to generate an interaction display effect corresponding to the operation of the charging procedure.

In an embodiment of a management method for status displaying of charging devices for use in a charging device coupled to a server via a network, an indication of an operation of a charging procedure performed by a user device is received via the network. Next, at least one illumination mode of a display light-panel of the charging device is respectively changed in response to the received indication, such that the display light-panel changes the light sources to generate an interaction display effect corresponding to the operation of the charging procedure, wherein the display light-panel changes the at least one illumination mode of the display light-panel in response to changes between a plurality of steps of the charging procedure performed on the user device.

In some embodiments, the charging device further comprises a storage unit for storing a mapping table, wherein the indication includes step identification data and the processor obtains the step identification data from the server through the network by the network connection unit and searches the mapping table using the step identification data to determine the at least one illumination mode of the display light-panel. In some embodiments, the step identification data further comprises a first charging step, a second charging step, and a third charging step, and the processor respectively changes the at least one illumination mode of the display light-panel to a first illumination mode, a second illumination mode, and a third illumination mode according to the first charging step, the second charging step, and the third charging step, wherein the display light-panel can produce different light brightness, color, and/or flicker frequency display effects in the first, second, and third illumination modes.

In some embodiments, the indication includes display indication data with a parameter setting, and the processor obtains the display indication data from the server through the network by the network connection unit and controls the changes of the light sources to determine the at least one illumination mode of the display light-panel according to the parameter setting in the display indication data. In some embodiments, the display indication data further comprises a first display indication, a second display indication, and a third display indication, and the processor respectively changes the at least one illumination mode of the display light-panel to a first illumination mode, a second illumination mode, and a third illumination mode according to the first display indication, the second display indication, and the third display indication, wherein the display light-panel can produce different light brightness, color, and/or flicker frequency display effects in the first, second, and third illumination modes.

In some embodiments, the processor further controls the color, brightness and/or flashing mode of the light generated by each of the light sources to change the at least one illumination mode of the display light-panel.

In some embodiments, the fixed pattern is a Quick Response Code, and the Quick Response Code is used to start the charging procedure.

In some embodiments, the light sources are a plurality of light-emitting diodes (LEDs).

In some embodiments, the processor further detects a device state of the charging device and dynamically switches the at least one illumination mode of the display light-panel according to the device state.

In some embodiments, the display light-panel further comprises at least one top plate and one bottom plate, wherein the optical light-guiding component is embedded and fixed on the top plate and the backlight module including the light sources is set on the bottom plate, wherein the light sources can be controlled to generate lights with a specific illumination mode, and the optical light-guiding component and the backlight module are arranged correspondingly to guide the lights of the specific light-emitting mode generated when the light sources emit lights on the optical light-guiding component to form an illumination surface on the surface of the display light-panel, so that the display light-panel produces a specific display effect.

Management methods for status displaying of charging devices may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
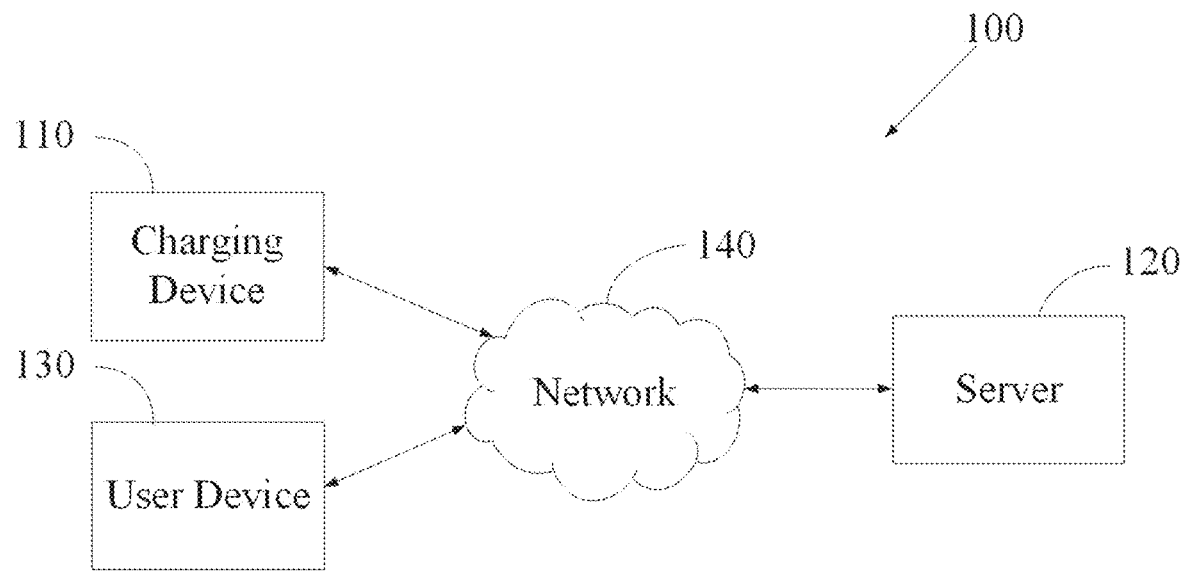
FIG. 1 is a schematic diagram illustrating an embodiment of a system for charging management of charging devices of the invention.

Charging Devices and Management Methods for Status Displaying Thereof are Provided FIG. 1 is a schematic diagram illustrating an embodiment of a system for charging management of charging devices of the invention. As shown in FIG. 1, the system for charging management of charging devices 100 of the present invention comprises a charging device 110, a server 120 and a user device 130. In some embodiments, the charging device 110 and the user device 130 can be coupled to the server 120 via a network 140 such as a wired network, a telecommunication network, and a wireless network, such as a Wi-Fi network or the like. The charging device 110 can output power for charging at least one electric vehicle. In one embodiment, the charging device 110 may be utilized for charging an electric vehicle. In another embodiment, the charging device 110 may be utilized for charging two or more electric vehicles.

The user device 130 may send a charging request corresponding to the charging device 110 to use the charging device 110 to charge an electric vehicle (for example, an electric scooter or an electric car). In some embodiments, the charging request may be sent to the server 120 via the network 140 by the user device 130 of a user of the corresponding electric vehicle. The user device 130 can be any electronic device with Internet capability, such as a mobile device, such as a mobile phone, a smartphone, a personal digital assistant, a global positioning system, a notebook computer and so on. In some embodiments, a user of an electric vehicle can use its user device 130 to download and install an application from the server 120 via the network 140 to generate a charging request through the user interface of the application. In some embodiments, the user can scan a Quick Response Code (hereinafter also referred to as QR code) on the charging device 110 through the scanning function of the application to initiate a charging procedure.

The server 120 may generate an indication in response to the user operation of the user device 130 and transmit it to the charging device 110 via the network 140 to instruct the charging device 110 to generate a respective display effect. In some embodiments, the user operation includes at least one charging procedure operation and the server 120 can generate display indication data or step identification data and transmit it to the charging device 110 via the network 140 to instruct the charging device 110 to generate a respective display effect. The charging device 110 can produce a corresponding display effect by changing different illumination modes of a display light-panel (not shown in FIG. 1). In one embodiment, the above-mentioned indication includes step identification data, wherein the step identification data includes related data indicating which step of the current process of the charging procedure is progressing. In another embodiment, the above-mentioned indication includes display indication data, wherein the display indication data provides a display parameter setting of the display light-panel. The server 120 can generate corresponding step identification data or display indication data corresponding to the user's operation through the user device 130 and send it to the charging device 110 via the network 140 such that the charging device 110 switches/changes the illumination mode of the display light-panel to produce the corresponding display effect according to the received step identification data or display indication data. Specifically, the charging procedure may include multiple steps. The server 120 may generate step identification data or display indications corresponding to the operating status of the charging procedure and transmit it to the charging device 110 through the network 140, such that the charging device 110 produces corresponding display changes upon receiving the step identification data or display indication data. In addition, the server 120 can also generate an indication and transmit it to the charging device 110 via the network 140, so as to allow the charging device 110 to output power to an electric vehicle which is electronically connected to the charging device 110 or prohibit the charging device 110 from outputting power to the electric vehicle.

For example, in one embodiment, the charging procedure may include at least a first charging step to start/enable the charging procedure, a second charging step to complete the payment and to enter the charging mode, and a third charging step indicating that it is in charging. The server 120 can determine current step of the charging procedure according to the user's operation on the user device 130 and generate the aforementioned step identification data according to the determined result. When receiving a charging request from the user device 130, the server 120 can perform a charging procedure with multiple steps and generate a corresponding step identification data or display indication data to the charging device 110 according to the changes among the steps of the corresponding charging procedure, such that the charging device 110 produces corresponding display changes upon receiving the step identification data or display indication data.

In some embodiments, the step identification data may include at least a first charging step, a second charging step, and a third charging step. The charging device 110 may respectively change the illumination mode of the display light-panel to a first illumination mode, a second illumination mode, and a third illumination mode according to the first charging step, the second charging step, and the third charging step, wherein the display light-panel can produce different light brightness, color, and/or flicker frequency display effects in the first, second, and third illumination modes. That is, when the step identification data indicates the first charging step, the charging device 110 changes the illumination mode of the display light-panel from a preset illumination mode to the first illumination mode; when the step identification data indicates the second charging step, the charging device 110 changes the illumination mode of the display light-panel from the first illumination mode to the second illumination mode; and when the step identification data indicates the third charging step, the charging device 110 changes the illumination mode of the display light-panel from the second illumination mode to the third illumination mode. In some embodiments, the display indication data may include at least a first, a second, and a third display indication, and the charging device 110 may change the illumination mode of the display light-panel to the first illumination mode, the second illumination mode, and the third illumination mode, respectively, according to the parameter setting in the first display indication, the second display indication, and the third display indication. Note that, in the first, second, and third illumination modes, the display light-panel can produce different light brightness, color, and/or flicker frequency display effects through changes in the light sources. In other words, when the display indication data is the first display setting, the charging device 110 changes the illumination mode of the display light-panel from the preset illumination mode to the first illumination mode; when the display indication data is the second display setting, the charging device 110 changes the illumination mode of the display light-panel from the first illumination mode to the second illumination mode; and when the display indication data is the third display setting, the charging device 110 changes the illumination mode of the display light-panel from the second illumination mode to the second illumination mode.

For example, in one embodiment, the first illumination mode may be slow flashing white light, the second illumination mode may be fast flashing white light, and the third illumination mode may be breathing white light. In another embodiment, the first illumination mode may be flashing white light, the second illumination mode may be flashing green light, and the third illumination mode may be flashing blue light. In other words, the display light-panel can display different display effects by controlling the light source changes in different illumination modes. It is noted that, above illumination modes are merely examples of the application, and the present invention is not limited thereto.

Figure 2:
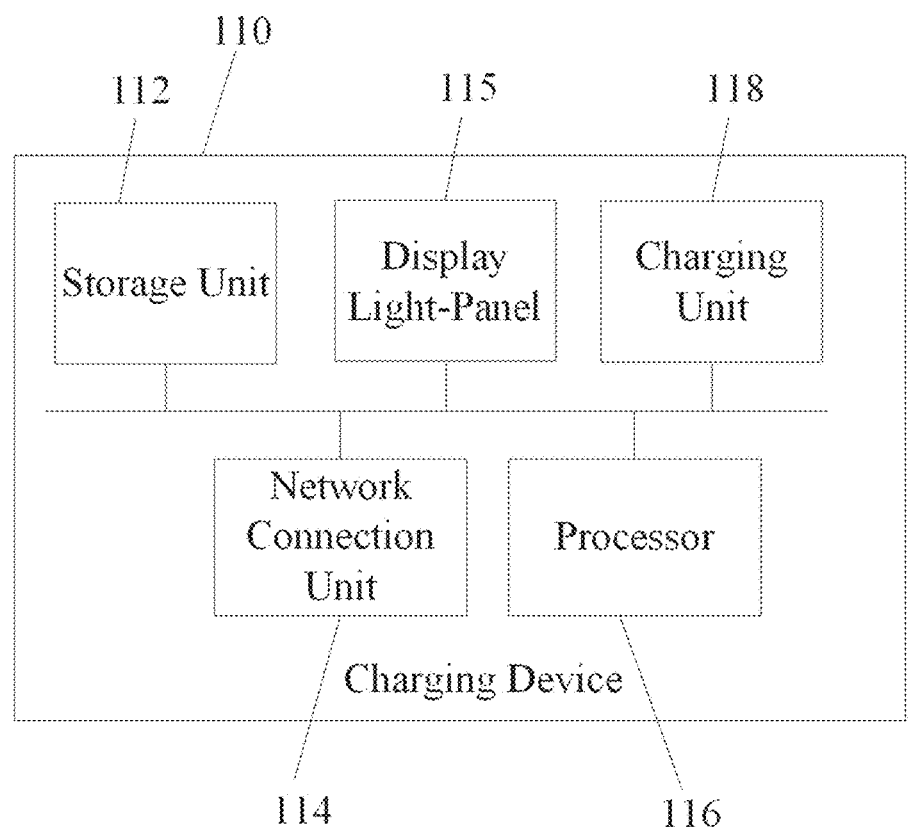
FIG. 2 is a schematic diagram illustrating an embodiment of a charging device of the invention.

FIG. 2 is a schematic diagram illustrating an embodiment of a charging device of the invention. The charging device shown in FIG. 2 can be applied to the charging device 110, wherein the charging device 110 has the processing computing ability to perform charging management operations for the charging device, and it also has the function of network connection in order to receive, download or update the various parameters and information required for charging management.

The charging device 210 at least comprises a storage unit 112, a network connection unit 114, a display light-panel 115, a processor 116, and a charging module 118. The network connection unit 114 can receive, download, or update various parameters and information required by the charging management operation via a network, such as a wired network, a telecommunications network, and a wireless network, such as a Wi-Fi network. The storage unit 112 (e.g., a memory) can store and record related data, such as charging device information contained in the charging device, a mapping table that records the correspondence between multiple step identification data and multiple illumination modes, and charging request information. It is noted that, above data is merely examples of the application, and the present invention is not limited thereto. The processor 116 can control related operations of software and hardware in the charging device 110 to perform the management methods for status displaying of the invention, the details of which will be described later. For example, the processor 116 can be a general-purpose controller, a micro-control unit (MCU), a digital signal processor (DSP), or the like, which provides the function of data analyzing, processing, and computing. However, it is understood that the present invention is not limited thereto. The charging unit 118 includes a plurality of charging connectors (for example, charging cables) that meet the same charging interface specifications or different charging interface specifications, which are electrically connected to an electric vehicle, and start or stop outputting power to the electric vehicle according to instructions of the processor 116.

The display light-panel 115 is arranged on the surface of the body of the charging device 110. In one embodiment, the display light-panel 115 is disposed at the center of the surface of the body of the charging device 110, but the invention is not limited thereto. In one embodiment, the display light-panel 115 may include at least a top plate (or so-called an upper surface layer) and a bottom plate (or so-called a lower layer), wherein the top plate includes an optical light-guiding component and the optical light-guiding component is printed with a fixed pattern while the bottom plate is provided with a backlight module. For example, in one embodiment, the optical light-guiding component can be a light-transmitting plate or a light guiding plate, but the invention is not limited thereto. In one embodiment, the fixed pattern can a two-dimensional bar code such as a QR code, etc. The fixed pattern can be used to enable/initiate a charging procedure of an electric vehicle.

The backlight module includes a plurality of light sources, and the light sources of the backlight module can be controlled to generate lights in a specific illumination mode. In some embodiments, the light sources of the backlight module are a plurality of light emitting diodes (LEDs), and a light-transmitting plate is disposed above the backlight module. The light-transmitting plate can be embedded and fixed in the top plate, so that when the lights generated by the light sources irradiate the light-transmitting plate, the lights can pass through the light-transmitting plate to form a light surface, so as to present various display effects. For example, the light sources can be light-emitting diodes of different colors, light-emitting diodes of a single color, or light-emitting diodes of RGB three-color integration, etc., but the invention is not limited thereto.

The light sources can have multiple illumination modes, and in different illumination modes, the light sources can have different light brightness, color, and/or flicker frequency, etc. In one embodiment, the top plate of the display light-panel 115 and the surface of the body of the charging device 110 are on the same horizontal plane. In another embodiment, the top plate of the display light-panel 115 and the surface of the body of the charging device 110 are on different horizontal planes, and the horizontal plane of the top plate of the display light-panel 115 is higher or lower than that of the surface of the body of the charging device 110 such that the display light-panel 115 is disposed in the body of the charging device in a convex or concave manner.

In some embodiments, the light sources of the backlight module can be set at a specific position to allow the light source produced by the light sources to conduct the light evenly. In one embodiment, the processor 116 may determine the relevant optical parameters of each light source according to different steps of the charging procedure, such as light luminous efficiency, wavelength, color, etc., so that the display light-panel 115 can change the display effect according to the specified lighting color and/or flashing mode, such as slow flashing, fast flashing, breathing light (intermittent flashing) of the same/different color light.

Figure 4A:
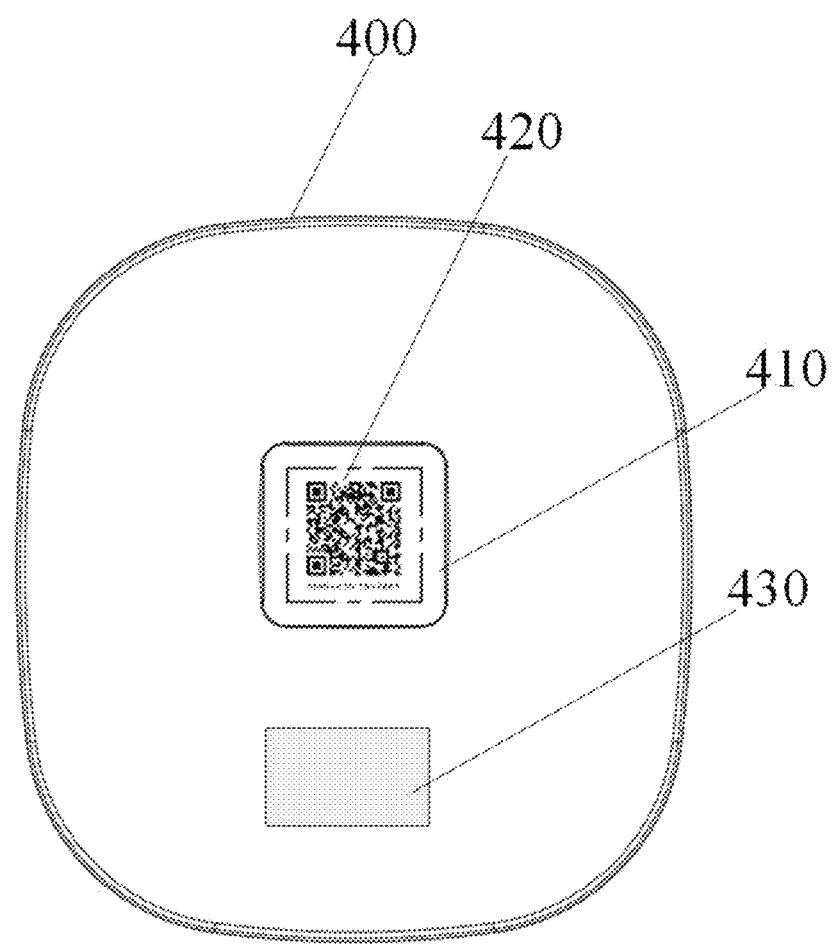
FIG. 4A is a schematic diagram illustrating an embodiment of the appearance of the charging device of the invention.
Figure 4B:
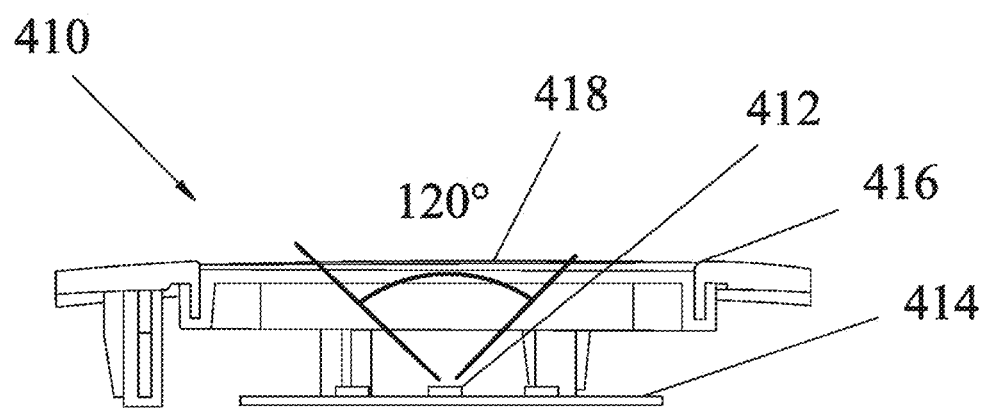
FIG. 4B is a schematic diagram illustrating an embodiment of the structure inside the display light-panel of the charging device of the invention.

FIG. 4A is a schematic diagram illustrating an embodiment of the appearance of the charging device of the invention. FIG. 4B is a schematic diagram illustrating an embodiment of the structure inside the display light-panel of the charging device of the invention. Please refer together with FIGS. 4A and 4B. The display light-panel 410 is arranged at the center of the body surface of the charging device 400. The display light-panel 410 may include at least a top plate 416 and a bottom plate 414, wherein the top plate 416 includes an optical light-guiding component 418 (e.g., a light-transmitting sheet or a light-transmitting plate) and the optical light-guiding component 418 is printed with a fixed pattern 420 (e.g., a QR code), and the bottom plate 414 is provided with a backlight module including a plurality of light sources 412 (e.g., LEDs). The light sources 412 of the backlight module can be controlled to generate lights with light emission pattern of a specific illumination mode, and the optical light-guiding component 418 is arranged corresponding to the backlight module. The optical light-guiding component 418 can be embedded and fixed in the top plate 416, to guide lights generated by the light sources 142 so that when the lights irradiate the optical light-guiding component 418, the lights can pass through the light-transmitting plate to form an illumination surface on the surface of the display light-panel 410, so as to enable the display light-panel 410 to present specific display effects. In this embodiment, the charging device 400 may further include a sensing area 430 to allow the user to touch the sensing area 430 with an authenticated physical card (for example, an RFID card) to quickly activate the charging procedure corresponding to the electric vehicle. In this embodiment, the backlight module may include 9 LEDs and each LED can provide an illumination range of 120 degrees. The above-mentioned LEDs are distributed in the middle area. Since the light source is hidden in the middle area, the light sources can't be seen from the outside, so that the LEDs can't be seen directly from the outside, and the scattered light can be used to make the surrounding light uniform, thus improving the visual effect of the lighting of the charging device.

In some embodiments, the storage unit 112 of the charging device 110 may store a mapping table. The mapping table records the correspondence between a plurality of step identification data and a plurality of illumination modes. The processor 116 obtains step identification data from the server 120 via the network 140, searches the mapping table using the step identification data to determine the illumination mode corresponding to each light source, and correspondingly controls the light source parameters of the backlight module in the display light-panel 115 to display the specified effect. Table 1 shows an example of the mapping table.

TABLE 1

| Step | Illumination mode | Display effect description |
|------|-------------------|----------------------------|
| S1 | P1 | White light flashes slowly |
| S2 | P2 | White light flashes quickly |
| S3 | P3 | White breathing light flashes |
| S4 | P4 | Yellow light always bright |
| S5 | P5 | Yellow light flashes quickly |
| S6 | P0 | White light always bright |

As shown in table 1, when the step identification data is obtained, Table 1 can be searched according to the step identification data to learn the corresponding illumination mode. In this example, when the step identification data is S1, the corresponding illumination mode is P1 and its display effect is white light flashing slowly; when the step identification data is S2, the corresponding illumination mode is P2 and its display effect is white light fast flashing; when the step identification data is S3, the corresponding illumination mode is P3 and its display effect is white light breathing light flashing; when the step identification data is S4, the corresponding illumination mode is P4 and its display effect is yellow light always bright; when the identification data is S5, the corresponding illumination mode is P5 and its display effect is yellow light flashing quickly; and when the step identification data is S6, the corresponding illumination mode is P0, and the display effect is white light always bright. It is noted that P0 is also referred to as the preset illumination mode or the standby illumination mode. For example, the step identification data S1 may indicate the first charging step to start/enable the charging procedure, the step identification data S2 may indicate a second charging step that payment is completed and it is ready to enter the charging mode, and the step identification data S3 may indicate a third charging step that it is in charging, the step identification data S4 may indicate a first abnormal step for the abnormal state of the device, and the step identification data S5 may indicate the second abnormal step of the abnormal state of the device. It is noted that, above data and table are merely examples of the application, and the present invention is not limited thereto.

In other embodiments, the server 120 may include a mapping table, which records the correspondence between a plurality of charging steps and a plurality of illumination modes, and the server 120 may receive a charging step indication from the user device 130 via the network 140, obtains the illumination mode corresponding to each light source according to the received charging step indication by looking-up the mapping table, and generate display indication data according to the corresponding illumination mode to the charging device 110 to instruct its backlight module to adjust the parameter settings of light sources to match the flicker frequency, wavelength, and/or color set by the aforementioned display parameter settings, thereby displaying the corresponding effect.

In some embodiments, the display parameter setting may include a first parameter, a second parameter, and a third parameter, wherein the first parameter is used to control the light color generated by the light sources, the second parameter is used to control the brightness of the lights generated by the light sources, and the third parameter is used to control the flicker frequency/mode of the lights generated by the light sources and so on. In this embodiment, the server 120 can send display indication data including these display parameter settings to the charging device 110 through the network 140, so that the processor 116 of the charging device 110 can determine the illumination mode corresponding to each light source according to the display parameter settings in the received display indication data, and respectively control the light source parameters of the backlight module in the display light-panel 115 to display the specified effect.

In some embodiments, the processor 116 of the charging device 110 can detect a device state of the charging device 110 and dynamically switch the illumination mode of each light source in the display light-panel 115 according to the detected device state, so as to switch the display effect of the display light panel 115. In one embodiment, the processor 116 may switch the illumination mode of the display light-panel 115 to a specific illumination mode to switch the display effect of the display light-panel 115 only when it detects that the device state of the charging device 110 meets a specific condition (for example, a specific abnormal condition). For example, when the device state of the charging device 110 is in the state of unable to provide service (first abnormal state), the processor 116 may switch the illumination mode of the display light-panel 115 to produce a display effect of constant yellow light, and when the device state of the charging device is in a fault state (second abnormal state), the processor 116 may switch the illumination mode of the display light-panel 115 to generate yellow light with fast flashing and so on. It is noted that, above steps, the illumination modes and the number and type of the device states of the charging device 110 are merely examples of the application, and the present invention is not limited thereto.

Figure 3:
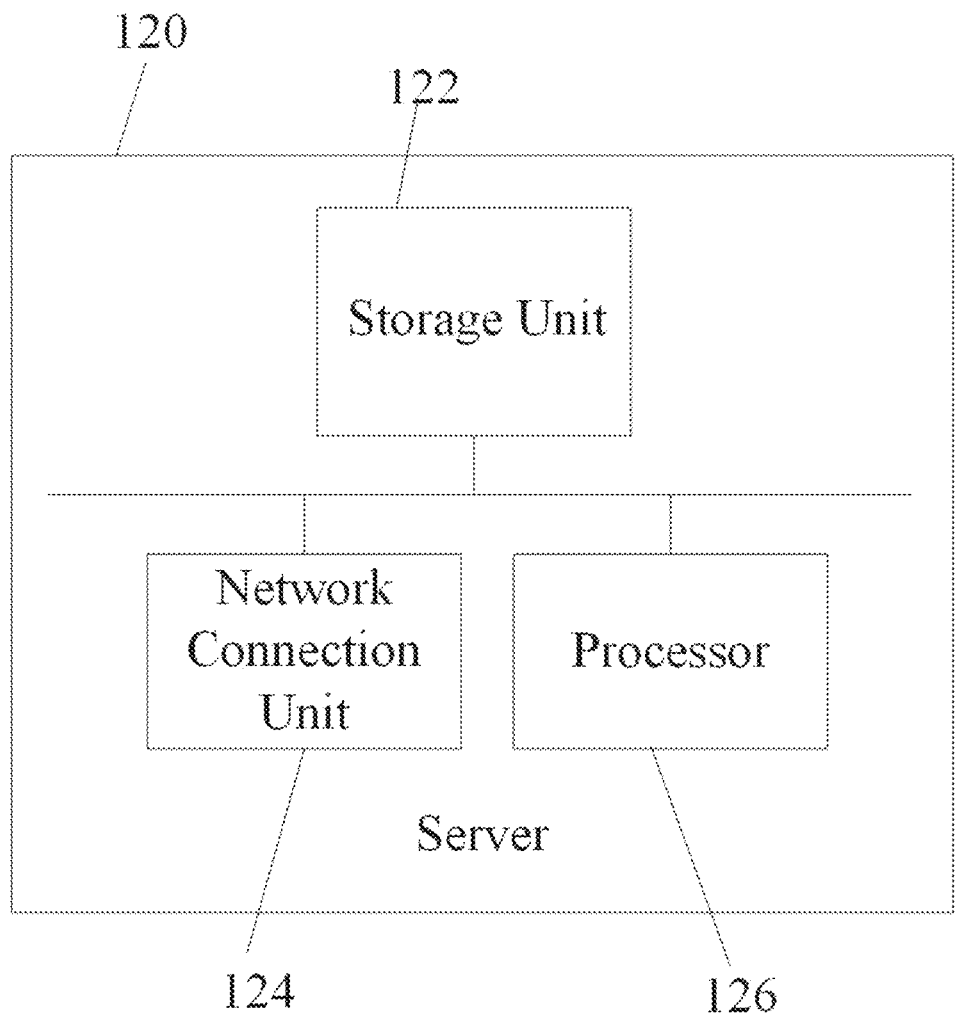
FIG. 3 is a schematic diagram illustrating an embodiment of a server of the invention.

FIG. 3 is a schematic diagram illustrating an embodiment of a server of the invention. As shown in FIG. 3, the server 120 of the invention can be any processor-based electronic device, which comprises at least a storage unit 122, a network connection unit 124, and a processor 126. It is noted that, the server 120 can perform charging management operations of a charging device 110. The network connection unit 124 can receive the corresponding coupling of different charging devices via a network 140, such as a wired network, a telecommunication network, and a wireless network, such as a Wi-Fi network, and it can transmit related data to different charging devices 110 via the network 140 to control the charging device 110 whether to output electric power to charge an electric vehicle. The storage unit 122 (e.g., a memory) can store and record related data, such as registered/authenticated codes, and information about mapping table that records the correspondence between multiple step identification data and the illumination modes corresponding thereto. It is noted that, above data is merely examples of the application, and the present invention is not limited thereto. Through the network connection unit 122, the server 120 can be coupled to the charging device 110 and the user device 130 and communicate with them via the network 140. The processor 126 can control related operations of software and hardware in the server 120 to perform the management method for status displaying of charging devices method for charging management of charging devices of the invention, the details of which will be described later. For example, the processor 126 can be a general-purpose controller, a micro-control unit (MCU), a digital signal processor (DSP), or the like, which provides the function of data analyzing, processing and computing. However, it is understood that the present invention is not limited thereto.

The server 120 may generate display indications or step identification data indication and transmit it to the charging device 110 via the network 140 to instruct the charging device 110 to generate a respective display effect. The step identification data includes related data indicating which step of the current process of the charging procedure is progressing. The server 120 can generate corresponding step identification data corresponding to the user's operation through the user device 130 and send it to the charging device 110 via the network 140 such that the charging device 110 switches/changes the illumination mode of the display light-panel 115 to produce the corresponding display effect according to the received step identification data.

In one embodiment, the server 120 may generate an indication in response to the operating state of the charging procedure and transmit it to the charging device 110 via the network 140. In another embodiment, the server 120 may receive a charging step indication or operation signals from the user device 130 via the network 140, obtains the illumination mode corresponding to each light source according to the received charging step indication or operation signals by looking-up the mapping table, and generate display indication data according to the corresponding illumination mode to the charging device 110 to instruct its backlight module to adjust the parameter settings of light sources to match the flicker frequency, wavelength, and/or color set by the aforementioned display parameter settings, thereby displaying the corresponding effect.

In some embodiments, the display parameter setting may include a first parameter, a second parameter, and a third parameter, wherein the first parameter is used to control the light color generated by the light sources, the second parameter is used to control the brightness of the lights generated by the light sources, and the third parameter is used to control the flicker frequency/mode of the lights generated by the light sources and so on. In this embodiment, the server 120 can send display indication data including these display parameter settings to the charging device 110 through the network 140, so that the charging device 110 can determine the illumination mode corresponding to each light source according to the display parameter settings in the received display indication data, and respectively control the light source parameters of the backlight module in the display light-panel 115 to display the specified effect.

Figure 5:
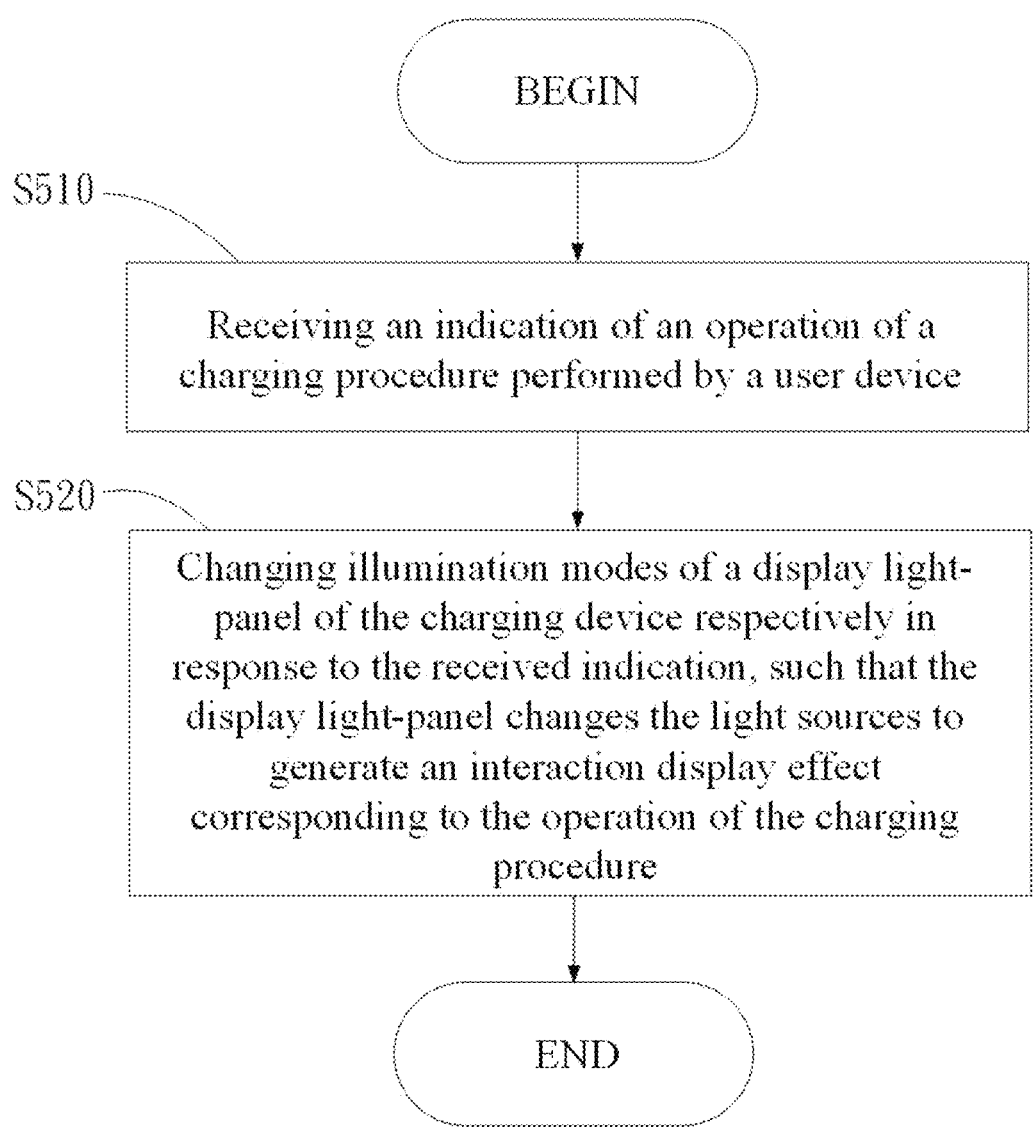
FIG. 5 is a flowchart of an embodiment of a management method for status displaying of charging devices of the invention.

FIG. 5 is a flowchart of an embodiment of a management method for status displaying of charging devices of the invention. The management method for status displaying of charging devices of the invention can be used in a charging device, such as the charging device 110 as shown in FIG. 1 and FIG. 2, and performed by the processor 116 of the charging device 110. The charging device 110 can be coupled to a server 120 via a network 140 such as a wired network, a telecommunications network, and a wireless network such as a Wi-Fi network.

First, in step S510, an indication of an operation of a charging procedure performed by a user device is received via the network. The user device can be any electronic device with an Internet capability, such as a mobile device, such as a mobile phone, a smartphone, a personal digital assistant, a global positioning system, a notebook and so on. In some embodiments, the user device may be coupled to the server via a network, such as a wired network, a telecommunications network, and a wireless network, such as a Wi-Fi network. In some embodiments, a user of an electric vehicle may use his/her user device to download an application from the server and install it to perform aforementioned charging procedure related operations through a user interface of this application. In some embodiments, the user can scan a QR code on the charging device 110 through the scanning function of the application to activate a charging procedure.

In one embodiment, the indication includes step identification data, wherein the step identification data includes related data indicating which step of the current process of the charging procedure is progressing. For example, in this embodiment, the charging procedure may include at least a first charging step to start/enable the charging procedure, a second charging step to complete the payment and to enter the charging mode, and a third charging step indicating that it is in charging. The server 120 can determine current step of the charging procedure according to the user's operation on the user device 130 and generate the aforementioned step identification data according to the determined result. In another embodiment, the indication includes display indication data, wherein the display indication data provides a display parameter setting of the display light-panel. The server 120 can generate corresponding step identification data or display indication data corresponding to the user's operation through the user device 130 and send it to the charging device 110 via the network 140. Specifically, the charging procedure may include multiple steps, and the server 120 may generate step identification data or display indications corresponding to the operating status of the charging procedure and transmit it to the charging device 110 through the network 140.

After the charging device 110 receives the indication (e.g., the step identification data or display indication data) of the operation of the charging procedure performed by the corresponding user device, then, in step S520, illumination modes of a display light-panel of the charging device are respectively changed in response to the received indication, such that the display light-panel changes the light sources to generate an interaction display effect corresponding to the operation of the charging procedure, wherein the display light-panel changes the illumination modes of the display light-panel in response to changes between a plurality of steps of the charging procedure performed on the user device. Specifically, the server 120 can generate corresponding step identification data or display indication data and send it to the charging device 110 via the network 140 to instruct the charging device 110 to generate a corresponding display effect, and the charging device 110 can receive the above indication and then switch/change the illumination modes of the display light-panel to produce the corresponding display effect according to the received indication.

When receiving a charging request from the user device 130, the server 120 can perform a charging procedure with multiple steps and generate a corresponding step identification data or display indication data to the charging device 110 according to the changes among the steps of the corresponding charging procedure, such that the charging device 110 produces corresponding display changes upon receiving the step identification data or display indication data. The server 120 can generate corresponding step identification data corresponding to the user's operation through the user device 130 and send it to the charging device 110 via the network 140 such that the charging device 110 switches/changes the illumination mode of the display light-panel to produce the corresponding display effect according to the received step identification data. In some embodiments, the step identification data may include at least a first charging step, a second charging step, and a third charging step. The charging device 110 may respectively change the illumination mode of the display light-panel to a first illumination mode, a second illumination mode, and a third illumination mode according to the first charging step, the second charging step, and the third charging step. That is, when the step identification data indicates the first charging step, the charging device 110 changes the illumination mode of the display light-panel from a preset illumination mode to the first illumination mode; when the step identification data indicates the second charging step, the charging device 110 changes the illumination mode of the display light-panel from the first illumination mode to the second illumination mode; and when the step identification data indicates the third charging step, the charging device 110 changes the illumination mode of the display light-panel from the second illumination mode to the third illumination mode.

In some embodiments, the display indication data may include at least a first, a second, and a third display indication, and the charging device 110 may change the illumination mode of the display light-panel to the first illumination mode, the second illumination mode, and the third illumination mode, respectively, according to the parameter setting in the first display indication, the second display indication, and the third display indication. Note that, in the first, second, and third illumination modes, the display light-panel can produce different light brightness, color, and/or flicker frequency display effects through changes in the light sources. In other words, when the display indication data is the first display setting, the charging device 110 changes the illumination mode of the display light-panel from the preset illumination mode to the first illumination mode; when the display indication data is the second display setting, the charging device 110 changes the illumination mode of the display light-panel from the first illumination mode to the second illumination mode; and when the display indication data is the third display setting, the charging device 110 changes the illumination mode of the display light-panel from the second illumination mode to the second illumination mode.

For example, in one embodiment, the first illumination mode may be slow flashing white light, the second illumination mode may be fast flashing white light, and the third illumination mode may be breathing white light. In another embodiment, the first illumination mode may be flashing white light, the second illumination mode may be flashing green light, and the third illumination mode may be flashing blue light. In other words, the display light-panel can display different display effects by controlling the light source changes in different illumination modes. It is noted that, above illumination modes are merely examples of the application, and the present invention is not limited thereto.

In some embodiments, the processor 116 of the charging device 110 can detect a device state of the charging device 110 and dynamically switch the illumination mode of each light source in the display light-panel 115 according to the detected device state, so as to switch the display effect of the display light panel 115. In one embodiment, the processor 116 may switch the illumination mode of the display light-panel 115 to a specific illumination mode to switch the display effect of the display light-panel 115 only when it detects that the device state of the charging device 110 meets a specific condition (for example, a specific abnormal condition). For example, when the device state of the charging device 110 is in the state of unable to provide service (first abnormal state), the processor 116 may switch the illumination mode of the display light-panel 115 to produce a display effect of constant yellow light, and when the device state of the charging device is in a fault state (second abnormal state), the processor 116 may switch the illumination mode of the display light-panel 115 to generate yellow light with fast flashing and so on, and the present invention is not limited thereto.

In some embodiments, the server 120 may include a mapping table. The mapping table records the correspondence between a plurality of charging steps and a plurality of illumination modes. The server 120 may receive a charging step indication from the user device 130 via the network 140, obtains the illumination mode corresponding to each light source according to the received charging step indication by looking-up the mapping table, and generate display indication data according to the corresponding illumination mode to the charging device 110 to instruct its backlight module to adjust the parameter settings of light sources to match the flicker frequency, wavelength, and/or color set by the aforementioned display parameter settings, thereby displaying the corresponding effect. In some embodiments, the display parameter setting may include a first parameter, a second parameter, and a third parameter, wherein the first parameter is used to control the light color generated by the light sources, the second parameter is used to control the brightness of the lights generated by the light sources, and the third parameter is used to control the flicker frequency/mode of the lights generated by the light sources and so on. In this embodiment, the server 120 can send display indication data including these display parameter settings to the charging device 110 through the network 140, so that the charging device 110 can determine the illumination mode corresponding to each light source according to the display parameter settings in the received display indication data, and respectively control the light source parameters of the backlight module in the display light-panel 115 to display the specified effect.

Figure 6:
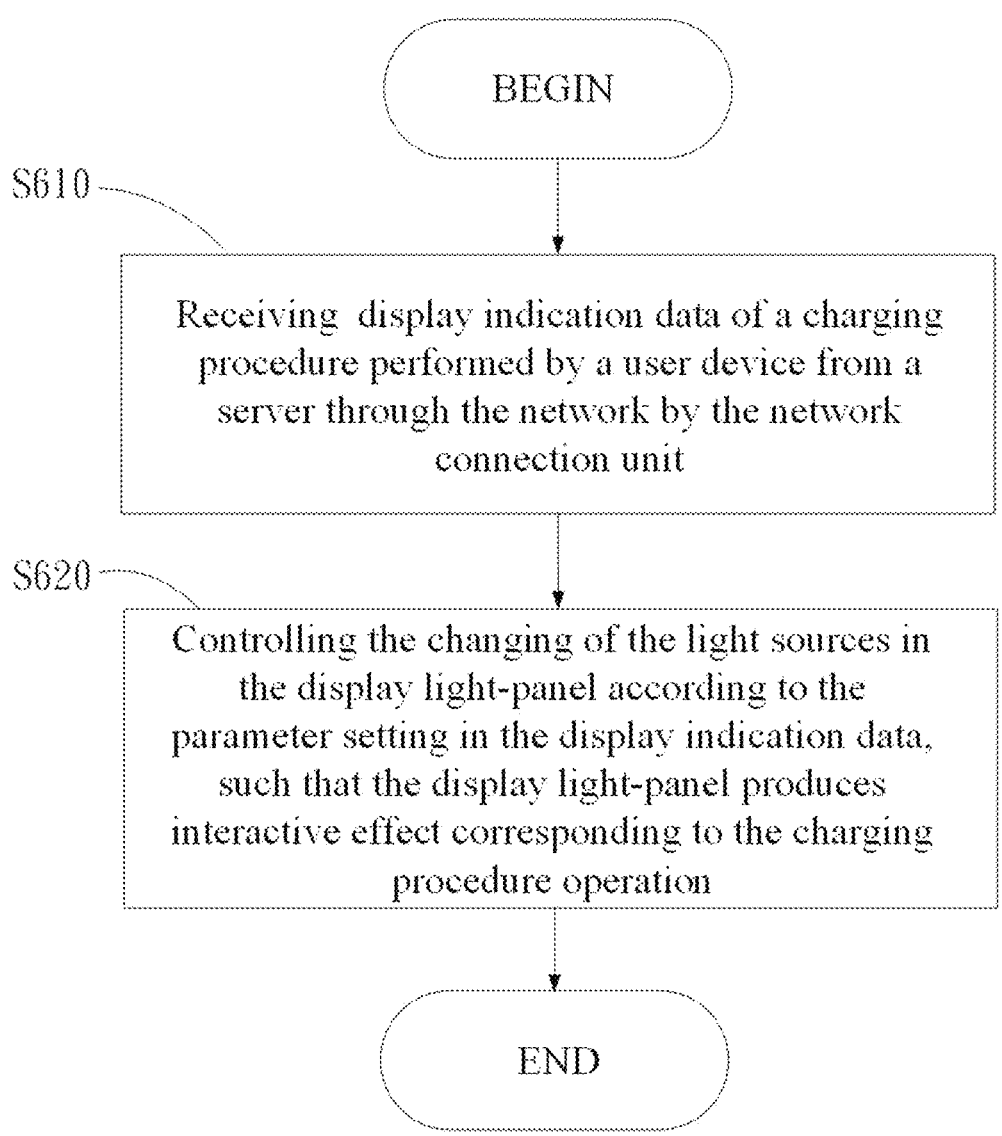
FIG. 6 is a flowchart of another embodiment of a management method for status displaying of charging devices of the invention.

FIG. 6 is a flowchart of another embodiment of a management method for status displaying of charging devices of the invention. The management method for status displaying of charging devices of the invention can be used in a charging device, such as the charging device 110 as shown in FIG. 1 and FIG. 2, and performed by the processor 116 of the charging device 110. The charging device 110 can be coupled to a server 120 via a network 140 such as a wired network, a telecommunications network, and a wireless network such as a Wi-Fi network. In this embodiment, the server 120 may include a mapping table (e.g., the Table 1), wherein the mapping table records the correspondence between a plurality of charging steps and a plurality of illumination modes.

First, in step S610, display indication data of a charging procedure performed by a user device is received from a server through the network by the network connection unit. In some embodiments, the server 120 may receive a charging step indication from the user device 130 via the network 140, obtain the illumination mode corresponding to each light source according to the received charging step indication by looking-up the mapping table, and then generate display indication data with specific parameter settings according to the setting of each illumination mode to the charging device 110. In some embodiments, the display parameter setting may include a first parameter, a second parameter, and a third parameter, wherein the first parameter is used to control the light color generated by the light sources, the second parameter is used to control the brightness of the lights generated by the light sources, and the third parameter is used to control the flicker frequency/mode of the lights generated by the light sources and so on.

Then, in step S620, the changing of the light sources in the display light-panel are controlled according to the parameter setting in the display indication data, such that the display light-panel produces an interactive effect corresponding to the charging procedure operation. Similarly, in some embodiments, the display parameter setting may include a first parameter, a second parameter, and a third parameter, wherein the first parameter is used to control the light color generated by the light sources, the second parameter is used to control the brightness of the lights generated by the light sources, and the third parameter is used to control the flicker frequency/mode of the lights generated by the light sources and so on. In this embodiment, the processor 116 of the charging device 110 can determine the illumination mode corresponding to each light source according to the display parameter settings in the received display indication data, and respectively control the light source parameters of the backlight module in the display light-panel 115 to display the specified effect.

In some embodiments, the storage unit 112 of the charging device 110 may store a mapping table. The mapping table records the correspondence between a plurality of step identification data and a plurality of illumination modes. The processor 116 obtains step identification data from the server 120 via the network 140, searches the mapping table using the step identification data to determine the illumination mode corresponding to each light source, and correspondingly controls the light source parameters of the backlight module in the display light-panel 115 to display the specified effect.

Figure 7:
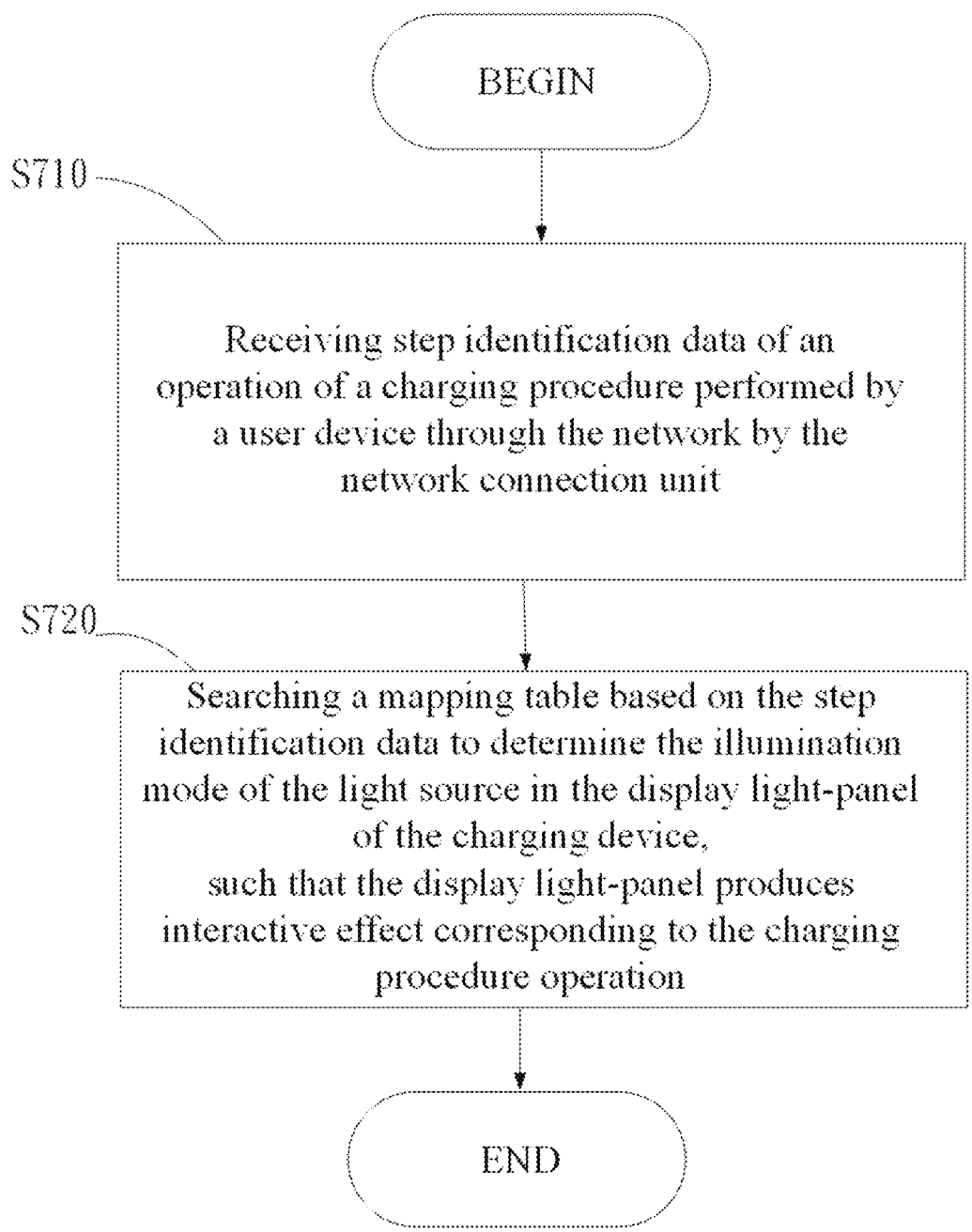
FIG. 7 is a flowchart of yet another embodiment of a management method for status displaying of charging devices of the invention.

FIG. 7 is a flowchart of yet another embodiment of a management method for status displaying of charging devices of the invention. The management method for status displaying of charging devices of the invention can be used in a charging device, such as the charging device 110 as shown in FIG. 1 and FIG. 2, and performed by the processor 116 of the charging device 110. The charging device 110 can be coupled to a server 120 via a network 140 such as a wired network, a telecommunications network, and a wireless network such as a Wi-Fi network. In this embodiment, the storage unit 112 of the charging device 110 may include a mapping table (e.g., the Table 1), wherein the mapping table records the correspondence between a plurality of step identification data and a plurality of illumination modes.

First, in step S710, step identification data of an operation of a charging procedure performed by a user device is received through the network by the network connection unit. In this embodiment, the processor of the charging device can use the network connection unit to obtain the step identification data from the server 120 through the network 140, wherein the step identification data includes related data indicating which step of the current process of the charging procedure is progressing. For example, in this embodiment, the charging procedure may include at least a first charging step to start/enable the charging procedure, a second charging step to complete the payment and to enter the charging mode, and a third charging step indicating that it is in charging. The server 120 can determine current step of the charging procedure according to the user's operation on the user device 130, generate the aforementioned step identification data according to the determined result and transmit it to the charging device 110 via the network 140.

Then, in step S720, the mapping table is searched based on the step identification data to determine the illumination mode of the light source in the display light-panel of the charging device, such that the display light-panel produces an interactive effect corresponding to the charging procedure operation. Taking the Table 1 as an example, after obtaining the step identification data, the table 1 can be searched according to the step identification data to obtain the corresponding illumination mode. In this example, when the step identification data is S1, the corresponding illumination mode is P1 and its display effect is white light flashing slowly; when the step identification data is S2, the corresponding illumination mode is P2 and its display effect is white light flashing quickly; when the step identification data is S3, the corresponding illumination mode is P3 and its display effect is white breathing light flashing; when the step identification data is S4, the corresponding illumination mode is P4 and its display effect is yellow light always bright; when the identification data is S5, the corresponding illumination mode is P5 and its display effect is yellow light flashing quickly; and when the step identification data is S6, the corresponding illumination mode is P0, and the display effect is white light always bright.

For example, the step identification data S1 may indicate the first charging step to start/enable the charging procedure, the step identification data S2 may indicate a second charging step that payment is completed and it is ready to enter the charging mode, and the step identification data S3 may indicate a third charging step that it is in charging, the step identification data S4 may indicate a first abnormal step for the abnormal state of the device, and the step identification data S5 may indicate the second abnormal step of the abnormal state of the device. In some embodiments, the step identification data may include at least a first charging step, a second charging step, and a third charging step. The charging device 110 may respectively change the illumination mode of the display light-panel to a first illumination mode, a second illumination mode, and a third illumination mode according to the first charging step, the second charging step, and the third charging step. That is, when the step identification data indicates the first charging step, the charging device 110 changes the illumination mode of the display light-panel from a preset illumination mode to the first illumination mode; when the step identification data indicates the second charging step, the charging device 110 changes the illumination mode of the display light-panel from the first illumination mode to the second illumination mode: and when the step identification data indicates the third charging step, the charging device 110 changes the illumination mode of the display light-panel from the second illumination mode to the third illumination mode.

For example, in one embodiment, the first illumination mode may be slow flashing white light, the second illumination mode may be fast flashing white light, and the third illumination mode may be breathing white light. In another embodiment, the first illumination mode may be flashing white light, the second illumination mode may be flashing green light, and the third illumination mode may be flashing blue light. In other words, the display light-panel can display different display effects by controlling the light source changes in different illumination modes. It is noted that, above illumination modes are merely examples of the application, and the present invention is not limited thereto.

Specifically, in this embodiment, the processor can control the light sources (LEDs) on the display light-panel according to the operating state of the charging procedure to switch the illumination modes accordingly as the steps of the charging procedure change. The lights of the LEDs on the display light-panel can be displayed correspondingly as the steps of the charging procedure change, and the LEDs can display different colors, intensities, and flicker frequencies to create various changes of flashing, thereby the effect can be displayed in a very user-friendly and intuitive way.

For example, in one embodiment, the display light-panel is set to the preset illumination mode (for example, the preset illumination mode is that each LED maintains a constant white light) when the display light-panel is in standby mode, and when the user scans the QR code on the display light-panel to start a charging procedure, the illumination mode of the display light-panel is immediately switched to the first illumination mode, and all the LEDs are controlled to respond with white light and slow flashing to inform the user that the charging device has been awakened. When the user completes the payment on the user device (such as a personal smartphone) and enters the ready-to-charge mode, the illumination mode of the display light-panel is switched to the second illumination mode to control all the LEDs to emit white light and fast flashing to inform the user that the payment has been completed and can start to connect the charging device to their electric vehicle; and when the user successfully starts charging, the illumination mode of the display light-panel is switched to the third illumination mode to control all the LEDs responds with white light and breathing light flashing to inform the user that it is charging.

In another embodiment, the display light-panel can be represented by different colors of light when the illumination mode is switched. For example, the display light-panel is set to a preset illumination mode when in standby mode (for example, the preset illumination mode is white light constant bright), and when the user scans the QR code on the display panel to start a charging procedure, the illumination mode of the display light-panel immediately switches to the first illumination mode, so that all the LEDs respond with green light and slow flashing. When the user completes the payment on the personal smart phone and enters the ready-to-charge mode, the illumination mode of the display light-panel is switched to the second illumination mode, so that all the LEDs respond with yellow light and fast flashing. After the user successfully starts charging, the illumination mode of the display light-panel is switched to the third illumination mode so that all the light-emitting diodes respond with blue light and breathing light flashing. In this way, the charging device can interact with the user through the corresponding changes of the display light-panel. The user can know the operation status of the charging procedure according to the interactive flashing of the display light-panel or various display effects during the charging procedure, which not only makes it easier for the user to handle the operation state of the charging procedure, but also brings the user a better user experience.

In some embodiments, the preset illumination mode for the standby mode can be set to display a color corresponding to the brand color. For example, when the representative color of brand A is orange, the preset illumination mode applied to the charging device of brand A in standby mode can be set to display orange lights, and when the representative color of brand B is yellow, the preset illumination mode applied to the charging device of brand B in standby mode can be set to display yellow lights, so that the brand color can be displayed in the standby mode to enhance brand recognition. Additionally, in some embodiments, the displayed color (also referred to as standby color) of the preset illumination mode in the standby mode of the charging device can be sequentially changed in response to a specific event to indicate a specific meaning, and the user can intuitively distinguish the meaning of representation based on the standby color. For example, in one embodiment, the standby colors may include any seven colors such as red, orange, yellow, green, blue, indigo, purple, etc., and sequentially represent specific events for Monday, Tuesday, Wednesday, Thursday, Friday, and Saturday. The standby color will change sequentially according to the above week setting. Therefore, when the standby color is red, the user can know that today is Monday directly by the color change displayed in the charging device, which can increase the utility and interest of the charging device.

Therefore, the charging devices and management methods for status displaying thereof of the present invention can reduce the manufacturing cost by providing the charging device with a display light-panel composed of low-cost light-emitting elements as light sources, and can change the illumination modes of the light sources within the display light-panel of the charging device to interact with an user by using an intuitive way to display the relevant status according to the operation state of the charging procedure during the user is performing a charging service, thereby not only making it easier for users to handle the operation state of the charging procedure, but also bring users a better user experience, and further effectively increasing the practicality and utilization rate of the charging device.

Management methods for status displaying of charging devices, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A charging device for outputting power to charge an electric vehicle, comprising:

a network connection unit coupled to a server through a network and receives an indication of an operation of a charging procedure performed by a user device corresponding to the electric vehicle via the network;

a display light-panel, having an optical light-guiding component and a backlight module, wherein the optical light-guiding component has a fixed pattern printed thereon and the backlight module includes light sources, and the optical light-guiding component and the light sources are respectively disposed to operate the display light-panel in at least one illumination mode; and a processor coupled to the network connection unit and the display light-panel, configured to respectively change the at least one illumination mode of the display light-panel in response to the received indication, such that the display light-panel changes the light sources to generate an interaction display effect corresponding to the operation of the charging procedure.

2. The charging device of claim 1, further comprising a storage unit for storing a mapping table, wherein the indication includes step identification data and the processor obtains the step identification data from the server through the network by the network connection unit and searches the mapping table using the step identification data to determine the at least one illumination mode of the display light-panel.

3. The charging device of claim 2, wherein the step identification data further comprises a first charging step, a second charging step, and a third charging step, and the processor respectively changes the at least one illumination mode of the display light-panel to a first illumination mode, a second illumination mode, and a third illumination mode according to the first charging step, the second charging step, and the third charging step, wherein the display light-panel can produce different light brightness, color, and/or flicker frequency display effects in the first, second, and third illumination modes.

4. The charging device of claim 1, wherein the indication includes display indication data with a parameter setting, and the processor obtains the display indication data from the server through the network by the network connection unit and controls the changes of the light sources to determine the at least one illumination mode of the display light-panel according to the parameter setting in the display indication data.

5. The charging device of claim 4, wherein the display indication data further comprises a first display indication, a second display indication, and a third display indication, and the processor respectively changes the at least one illumination mode of the display light-panel to a first illumination mode, a second illumination mode, and a third illumination mode according to the first display indication, the second display indication, and the third display indication, wherein the display light-panel can produce different light brightness, color, and/or flicker frequency display effects in the first, second, and third illumination modes.

6. The charging device of claim 1, wherein the processor further controls the color, brightness and/or flashing mode of the light generated by each of the light sources to change the at least one illumination mode of the display light-panel.

7. The charging device of claim 1, wherein the fixed pattern is a Quick Response Code, and the Quick Response Code is used to start the charging procedure.

8. The charging device of claim 1, wherein the light sources are a plurality of light-emitting diodes (LEDs).

9. The charging device of claim 1, wherein the processor further detects a device state of the charging device and dynamically switches the at least one illumination mode of the display light-panel according to the device state.

10. The charging device of claim 1, wherein the display light-panel further comprises at least one top plate and one bottom plate, wherein the optical light-guiding component is embedded and fixed on the top plate and the backlight module including the light sources is set on the bottom plate, wherein the light sources can be controlled to generate lights with a specific illumination mode, and the optical light-guiding component and the backlight module are arranged correspondingly to guide the lights of the specific illumination mode generated when the light sources emit lights on the optical light-guiding component to form an illumination surface on the surface of the display light-panel, so that the display light-panel produces a specific display effect.

11. A management method for status displaying of charging devices for use in a charging device, wherein the charging device is coupled to a server via a network, the method comprising:
   having a display light-panel, having an optical light-guiding component and a backlight module, wherein the optical light-guiding component has a fixed pattern printed thereon and the backlight module includes light sources; and
   receiving an indication of an operation of a charging procedure performed by a user device via the network; and
   respectively changing at least one illumination mode of a display light-panel of the charging device in response to the received indication, such that the display light-panel changes the light sources to generate an interaction display effect corresponding to the operation of the charging procedure,
   wherein the display light-panel changes the at least one illumination mode of the display light-panel in response to changes between a plurality of steps of the charging procedure performed on the user device.

12. The management method for status displaying of claim 11, wherein the indication comprises step identification data and the charging device further comprises a storage unit storing with a mapping table and the method further comprises the steps of:
   obtaining the step identification data from the server through the network; and
   searching the mapping table using the step identification data to determine the at least one illumination mode of the display light-panel.

13. The management method for status displaying of claim 12, wherein the step identification data further comprises a first charging step, a second charging step, and a third charging step, and the step of respectively changing the at least one illumination mode of the display light-panel of the charging device in response to the received indication further comprises the steps of:
   respectively changing the at least one illumination mode of the display light-panel to a first illumination mode, a second illumination mode, and a third illumination mode according to the first charging step, the second charging step, and the third charging step,
   wherein the display light-panel can produce different light brightness, color, and/or flicker frequency display effects in the first, second, and third illumination modes.

14. The management method for status displaying of claim 11, wherein the indication comprises display indication data with a parameter setting, and the method further comprises the steps of:
   receiving the display indication data from the server through the network; and
   controlling the changes of the light sources to determine the at least one illumination mode of the display light-panel according to the parameter setting in the display indication data.

15. The management method for status displaying of claim 14, wherein the display indication data further comprises a first display indication, a second display indication, and a third display indication, and the step of respectively changing the at least one illumination mode of the display light-panel of the charging device in response to the received indication further comprises the steps of:
   respectively changing the at least one illumination mode of the display light-panel to a first illumination mode, a second illumination mode, and a third illumination mode according to the first display indication, the second display indication and the third display indication,
   wherein the display light-panel can produce different light brightness, color, and/or flicker frequency display effects in the first, second, and third illumination modes.

16. The management method for status displaying of claim 11, wherein the changing of the at least one illumination mode of the display light-panel processor is performed by controlling the color, brightness and/or flashing mode of the light generated by each of the light sources.

17. The management method for status displaying of claim 11, further comprising:
   detecting a device state of the charging device; and
   dynamically switches the at least one illumination mode of the display light-panel to a specific illumination mode when the device state meets a specific condition.

18. The management method for status displaying of claim 11, wherein the light sources are a plurality of light-emitting diodes (LEDs).

19. A machine-readable storage medium comprising a computer program, which, when executed, causes a device to perform a management method for status displaying of charging devices, wherein the method comprises:
   having a display light-panel, having an optical light-guiding component and a backlight module, wherein the optical light-guiding component has a fixed pattern printed thereon and the backlight module includes light sources; and
   receiving an indication of an operation of a charging procedure performed by a user device a network; and
   respectively changing at least one illumination mode of a display light-panel of the charging device in response to the received indication, such that the display light-panel changes the light sources to generate an interaction display effect corresponding to the operation of the charging procedure,
   wherein the display light-panel changes the at least one illumination mode of the display light-panel in response to changes between a plurality of steps of the charging procedure performed on the user device.

* * * * *